United States Patent [19]

Haile

[11] 4,029,399

[45] * June 14, 1977

[54] FRAME FOR CONVEX MIRROR

[76] Inventor: Ernest Haile, 30 Cadwalader Terrace, Trenton, N.J. 08618

[ * ] Notice: The portion of the term of this patent subsequent to Mar. 22, 1994, has been disclaimed.

[22] Filed: Feb. 19, 1976

[21] Appl. No.: 659,549

[52] U.S. Cl. .............................. 350/293; 350/303
[51] Int. Cl.² .......................................... G02B 5/10
[58] Field of Search ........... 350/288, 293, 302–304, 350/307; D12/187, 189

[56] References Cited

UNITED STATES PATENTS

| | | | |
|---|---|---|---|
| 3,170,985 | 2/1965 | Katulich | 350/293 |
| 3,389,952 | 6/1968 | Tobin, Jr. | 350/293 X |
| 3,563,638 | 2/1971 | Panozzo | 350/293 |
| 3,901,587 | 8/1975 | Haile | 350/293 |
| 3,918,799 | 11/1975 | Kurz, Jr. et al. | 350/288 |

Primary Examiner—John K. Corbin
Assistant Examiner—F. L. Evans
Attorney, Agent, or Firm—Clarence A. O'Brien; Harvey B. Jacobson

[57] ABSTRACT

A mounting plate of generally semi-circular plan shape is provided and includes one straight side edge and an opposing arcuate side edge whose opposite ends converge toward the ends of the straight side edge. The arcuate side edge of the mounting plate includes outturned flange portions which terminate outwardly in inturned flange portions and the front side of the plate includes a pair of generally parallel reinforcing flanges extending outwardly therefrom and disposed at generally right angles to the straight side edge of the mounting plate and the mounting plate. The outer marginal portions of the flanges are arcuate and curve inwardly from the ends of the flanges adjacent the straight side edge of the mounting plate toward the mounting plate adjacent the arcuate side edge of the mounting plate. A partial convex spherical mirror element of generally semi-circular plan shape is disposed in registry over the front side of the mounting plate with the arcuate edge of the mirror element received in the aforementioned upturned flange portions of the arcuate side edge of the mounting plate. In addition, the outer marginal edges of the flanges abut the back or undersurface of the mirror element for bracing the same and a cap plate is provided including a first straight longitudinal edge portion and a second outwardly convex arcuate edge portion. The cap plate is secured over the straight side edge of the mounting plate and the corresponding edge of the mirror element and includes flange portions embracingly engaging the straight side edge of the mounting plate and the corresponding edge of the mirror element.

7 Claims, 4 Drawing Figures

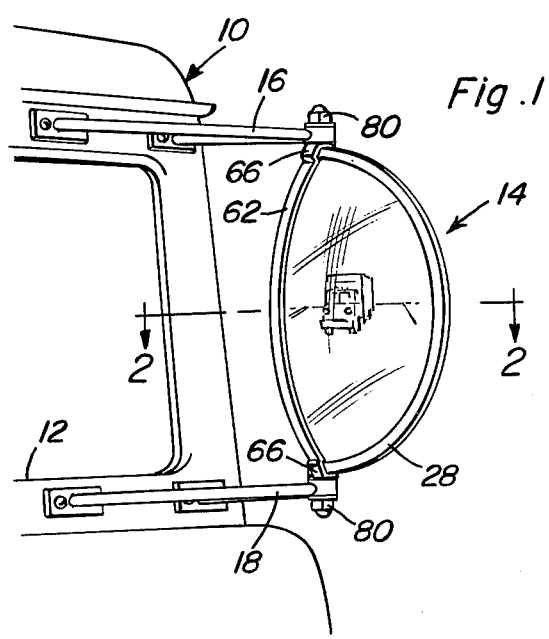
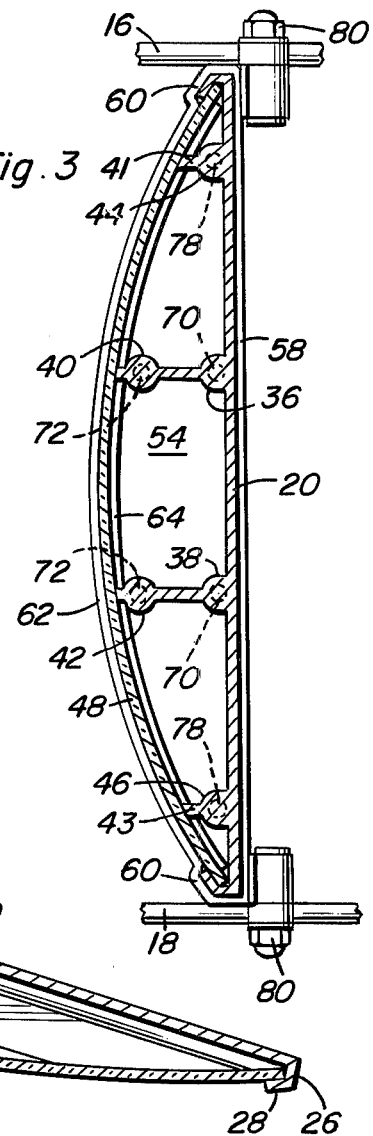
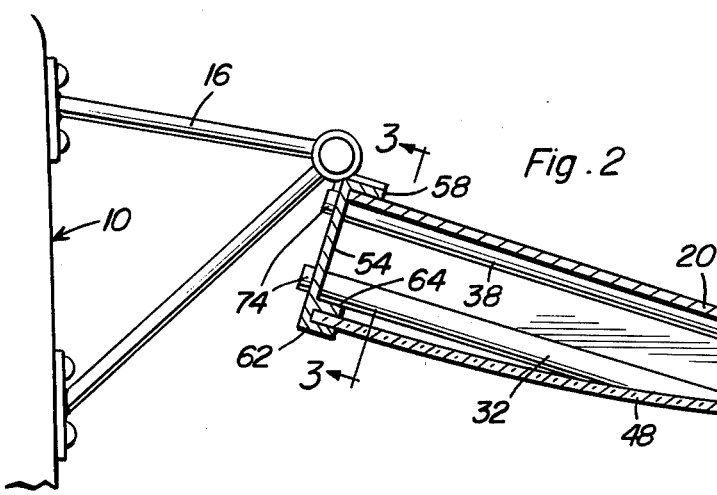
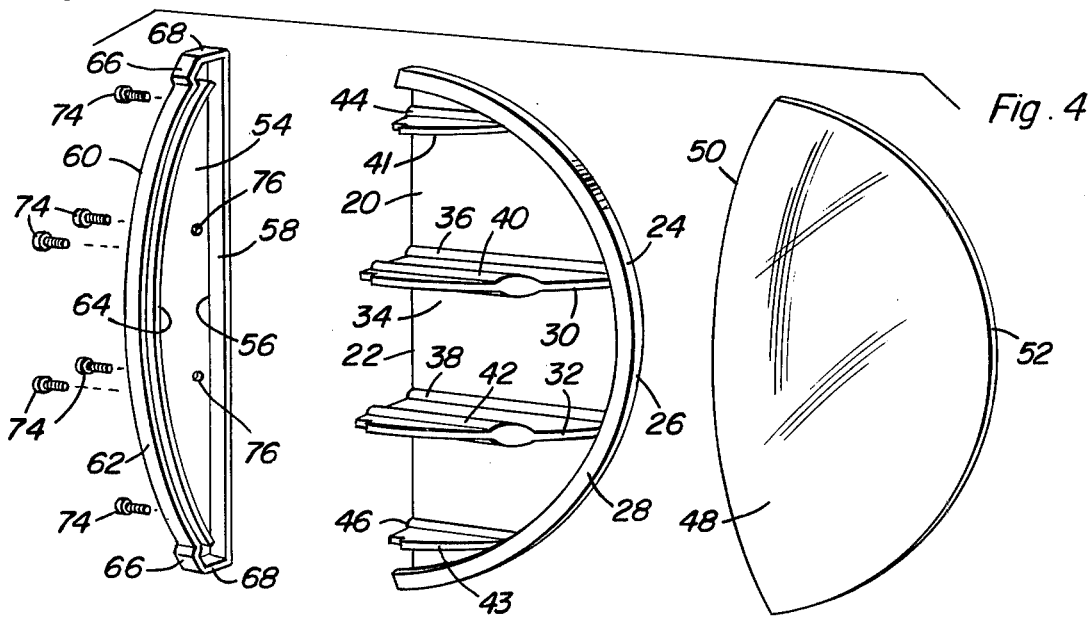

FRAME FOR CONVEX MIRROR

BACKGROUND OF THE INVENTION

Mirror construction providing horizontally widened and vertically elongated rear viewing areas have been heretofore designed. However, these previously designed mirror constructions have for various reasons been costly to manufacture. Examples of previously patented mirror constructions including some of the basic structural features of the instant invention are disclosed in U.S. Pat. Nos. 2,493,546, 2,337,285, 3,776,618 and 3,527,527. In addition, the instant invention comprises an improvement over the frame for convex mirror disclosed in my co-pending U.S. application Ser. No. 603,244, filed Aug. 8, 1975.

BRIEF DESCRIPTION OF THE INVENTION

The invention includes a mirror element which is generally semi-circular in plan shape and yet is partial convex spherical in configuration. The mirror element is supported by a specifically designed frame which may be readily constructed of a durable plastic and the mirror element and frame include coacting portions whereby the mirror element may be readily inserted into the frame, the latter including an open side through which the mirror element is inserted and an end plate being provided for removably closing the open side of the frame. Additionally, inasmuch as the frame is constructed of plastic material the need for peripherally arranged mirror element cushioning gasket material is eliminated in all instances except those wherein the frame might be subjected to severe vibrations.

It is proposed that the frame portion of the instant invention be constructed of plastic for various reasons including substantially total resistance to weathering and corrosion, color matching to the color of the associated vehicle and inexpensive cost of manufacture.

The main object of this invention is to provide a rear vision mirror construction for a vehicle including only two basic components other than the mirror elements thereof and which therefore may be manufactured at a reasonable low cost.

Another object of this invention is to provide a frame construction for a rear vision mirror to be attached to a vehicle with the structural features of the frame enabling the latter to be readily constructed of plastic by conventional manufacturing processes.

Still another object of this invention is to provide a mirror construction frame constructed of plastic and which will therefore eliminate the need for cushioning gasket material around the associated mirror element in substantially all instances.

Another important object of this invention is to provide a mirror construction in accordance with the preceding objects and which may be readily usable in environments other than as a rear vision vehicle mirror.

A final object of this invention to be specifically enumerated herein is to provide a mirror construction which will conform to conventional forms of manufacture, be of simple construction and easy to use so as to provide a device which will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of the right hand forward portion of a vehicle with the mirror construction of the instant invention mounted on the vehicle in position as a rear vision mirror;

FIG. 2 is an enlarged fragmentary horizontal sectional view taken substantially upon the plane indicated by the section line 2—2 of FIG. 1;

FIG. 3 is a fragmentary sectional view taken substantially upon the plane indicated by the section line 3—3 of FIG. 2; and FIG. 4 is an exploded perspective view of the various components which together form the mirror construction.

DETAILED DESCRIPTION OF THE INVENTION

Referring now more specifically to the drawings the numeral 10 generally designates a motor vehicle including a right-hand forward door 12. The mirror construction of the instant invention is referred to in general by the reference numeral 14 and is adjustably supported from the door 12 by means of conventional mirror supporting brackets 16 and 18.

The mirror construction 14 includes a mounting plate 20 having first and second opposite side edges 22 and 24. The side edge 22 is substantially straight and the side edge 24 is substantially semi-circular with its opposite ends converging toward and intersecting with the opposite ends of the side edge 22. The side edge 24 includes a first forwardly projecting semi-circular flange 26 extending therealong and terminating outwardly in a second inturned flange 28 extending along the full length of the outer edge of the flange 26 and inclined outwardly relative to the plate 20. In addition, the plate 20 includes a pair of outwardly projecting parallel flanges 30 and 32 extending outwardly of the face 34 of the plate 20 over which the flange 28 extends and the flanges 30 and 32 are disposed at substantially right angles relative to the plate 20 and the straight side edge 22 thereof and extend from the latter toward the flange 26, the flanges 30 and 32 being spaced apart approximately one-third the length of the edge 22 and each being spaced from the corresponding end of the edge 22 approximately the same distance.

The base edge portions of the flanges 30 and 32 include thickened portions 36 and 38 and the outer portions of the flanges 30 and 32 include additional thickened portions 40 and 42. Still further, the opposite end portions of the straight edge portion 22 of the plate 20 include outstanding flanges 41 and 43 including bulbous portions 44 and 46.

A partial convex spherical mirror element 48 is provided and the plan shape of the element 48 is semi-circular so as to conform to the semi-circular shape of the plate 20. The mirror element 48 includes first and second edges 50 and 52 corresponding to the edges 22 and 24 and the edge 52 of the element 48 is removably received beneath the flange 28 while the edge 50 of the element 48 extends over the free edge portions of the flanges 30, 32, 41 and 43 for support therefrom.

A cap plate 54 is provided and includes a first straight longitudinal edge 56 having an outstanding flange 58 and a second arcuate edge 60 having an outstanding arcuate flange 62 supported therefrom. In addition, an arcuate flange 64 underlies the flange 62 and the opposite end portions of the flange 62 are outwardly offset as at 66. Finally, the cap plate 46 includes outstanding end flanges 68 extending between and connecting the remote ends of the offset end portion 66 and the adjacent ends of the flange 58.

The ends of the portion 36 and 38 remote from the flange 26 include outwardly opening blind bores 70 and the portions 40 and 42 have similar blind bores 72 formed therein. The end plate 54 is telescoped over the straight edge portion 22 of the plate 20 and the edge 50 of the mirror element 48 with the opposite ends of the flange 28 received beneath the offset portions 66 of the flange 62. Then, suitable self-threading shank-type fasteners 74 are secured through openings 76 provided therefor in the plate 54 and in the blind bores 70 and 72 formed in the portions 36, 38 and 40, 42 as well as similar blind bores 78 formed in the portions 44 and 46, the edge 50 of the mirror element 48 being received beneath the flange 62 and above the flange 64, the notched portions of flanges 30, 32, 41 and 43 receiving the corresponding ends of the flange 64 thereover.

The plate 20 and its various components as well as the plate 54 and its various components may be constructed of plastic. Accordingly, all of the components of the mirror construction 14 except for the mirror element 48 and the fasteners 74 may be readily mass produced at low cost. In addition, from the foregoing it will be understood that the mirror construction 14 may be readily assembled and that the mirror element 48 thereof will be provided cushioning against impact by the plastic material of which the plates 20 and 54 are constructed.

In order to support the mirror construction 14 from brackets 16 and 18, pivot fastener structures 80 are secured through the opposite end portions of the flange 26 and also through the outer ends of the brackets 16 and 18. Alternately, instead of utilizing a pair of pivot fastener structures 64, a single pivot shaft structure may extend between and have its opposite ends secured through the opposite end portions of the flange 26, suitable opening being provided through the flanges 30 and 32 if such a pivot shaft structure is to be utilized.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A mirror construction comprising a mirror element including first and second opposite side edges, a mounting plate of a plan shape corresponding to the plan shape of said element over one side of which said element is placed in plan registry therewith, said plate including first and second opposite side edges correesponding with the first and second side edges, respectively, of said element, the first side edge of said plate being generally straight, the second side edge of said plate including opposite end portions which curve inwardly toward the remote ends of the first side edge of said plate, said second side edge end portions including retaining flange portions extending therealong, projecting outwardly of said one side of said plate and terminating outwardly in inwardly directed flange portions overlying said one side of said plate in spaced relation relative thereto, elongated reinforcing flanges supported from said one side of said mounting plate, projecting outwardly therefrom and extending between said first and second edges of said plate, said reinforcing flanges including arched outer longitudinal edges underlying, abutted by and closely conforming to the contours of the adjacent portions of the side of said mirror element opposing said one side of said mounting plate with said second side edge of said element being held captive within said retaining flange portions and beneath said inwardly directed flange portions, and a cap panel removably secured over said first side edge of said plate and the corresponding edge of said element, said cap panel including a first inturned retaining flange overlying the outer side of the first side edge of said element and a second inturned flange overlying the first side edge marginal portion of said plate on the other side thereof.

2. The combination of claim 1 including mounting means supported from said mounting plate for support of said mirror construction from a support structure.

3. The combination of claim 1 wherein said mounting means includes means mounting said plate from said mounting means for adjustable angular diplacement relative thereto about an axis generally paralleling said first side edge of said mounting plate.

4. The combination of claim 1 wherein the opposite end portions of said first inwardly directed flange include outwardly offset terminal ends overlying the corresponding ends of said inturned flange portions.

5. The combination of claim 1 wherein said cap panel is removably secured position by means of fasteners secured through said cap panel and into the adjacent ends of said reinforcing flanges.

6. The combination of claim 1 wherein said element is convex spherical in configuration.

7. The combination of claim 1 wherein said cap panel includes a third inturned flange generally paralleling and spaced inwardly of said first inturned flange underlying and supporting said first side edge of said element.

* * * * *